(12) United States Patent
Yea et al.

(10) Patent No.: US 11,580,670 B2
(45) Date of Patent: *Feb. 14, 2023

(54) METHOD AND APPARATUS FOR INTER-CHANNEL PREDICTION AND TRANSFORM FOR POINT CLOUD ATTRIBUTE CODING

(71) Applicant: TENCENT AMERICA LLC, Palo Alto, CA (US)

(72) Inventors: Sehoon Yea, Palo Alto, CA (US); Arash Vosoughi, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,578

(22) Filed: Dec. 9, 2021

(65) Prior Publication Data
US 2022/0101561 A1   Mar. 31, 2022

Related U.S. Application Data

(63) Continuation of application No. 16/924,790, filed on Jul. 9, 2020, now Pat. No. 11,232,599.

(60) Provisional application No. 62/872,972, filed on Jul. 11, 2019.

(51) Int. Cl.
*G06T 9/00* (2006.01)
*H04N 19/61* (2014.01)
*H04N 19/85* (2014.01)

(52) U.S. Cl.
CPC ............... *G06T 9/00* (2013.01); *H04N 19/61* (2014.11); *H04N 19/85* (2014.11)

(58) Field of Classification Search
CPC .......... G06T 9/00; G06T 9/001; H04N 19/85; H04N 19/61; H04N 19/503; H04N 19/96; H04N 19/186; H04N 19/169; H04N 19/124; H04N 19/597
See application file for complete search history.

(56) References Cited

U.S. PATENT DOCUMENTS

2017/0347100 A1   11/2017   Chou et al.
2019/0116357 A1   4/2019    Tian et al.
2020/0314435 A1   10/2020   Tourapis et al.

*Primary Examiner* — Jared Walker
(74) *Attorney, Agent, or Firm* — Sughrue Mion, PLLC

(57) ABSTRACT

A method of interframe point cloud attribute coding is performed by at least one processor and includes coding a first color attribute of a point of a point cloud to obtain a first reconstructed residual, coding a second color attribute of the point to obtain a second reconstructed residual, and determining a quantization index of the second reconstructed residual, based on the first reconstructed residual and the second reconstructed residual. The method further includes updating the second reconstructed residual, based on the quantization index and the first reconstructed residual.

20 Claims, 9 Drawing Sheets

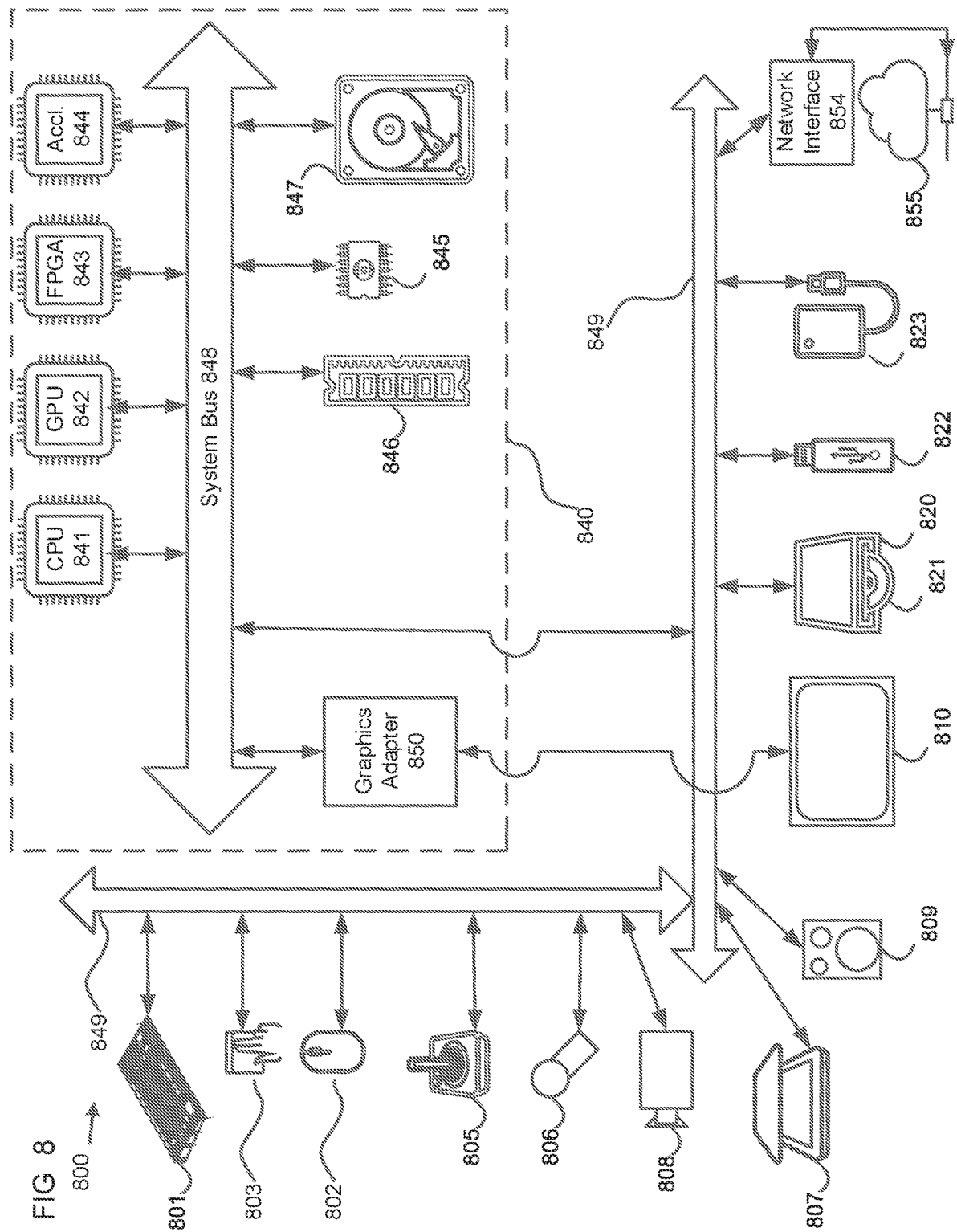

METHOD AND APPARATUS FOR INTER-CHANNEL PREDICTION AND TRANSFORM FOR POINT CLOUD ATTRIBUTE CODING

CROSS-REFERENCE TO RELATED APPLICATION

This application is a continuation application of U. S. application Ser. No. 16/924,790, filed Jul. 9, 2020, which claims priority from U.S. Provisional Patent Application No. 62/872,972, filed on Jul. 11, 2019, in the U.S. Patent and Trademark Office, which is incorporated herein by reference in its entirety.

BACKGROUND

1. Field

Methods and apparatuses consistent with embodiments relate to graph-based point cloud compression (G-PCC), and more particularly, a method and an apparatus for inter-channel prediction and transform for point cloud attribute coding.

2. Description of Related Art

Advanced three-dimensional (3D) representations of the world are enabling more immersive forms of interaction and communication, and also allow machines to understand, interpret and navigate our world. 3D point clouds have emerged as an enabling representation of such information. A number of use cases associated with point cloud data have been identified, and corresponding requirements for point cloud representation and compression have been developed.

A point cloud is a set of points in a 3D space, each with associated attributes, e.g., color, material properties, etc. Point clouds can be used to reconstruct an object or a scene as a composition of such points. They can be captured using multiple cameras and depth sensors in various setups, and may be made up of thousands up to billions of points to realistically represent reconstructed scenes.

Compression technologies are needed to reduce the amount of data to represent a point cloud. As such, technologies are needed for lossy compression of point clouds for use in real-time communications and six degrees of freedom (6 DoF) virtual reality. In addition, technology is sought for lossless point cloud compression in the context of dynamic mapping for autonomous driving and cultural heritage applications, etc. The Moving Picture Experts Group (MPEG) has started working on a standard to address compression of geometry and attributes such as colors and reflectance, scalable/progressive coding, coding of sequences of point clouds captured over time, and random access to subsets of a point cloud.

FIG. 1A is a diagram illustrating a method of generating levels of detail (LoD) in G-PCC.

Referring to FIG. 1A, in current G-PCC attributes coding, an LoD (i.e., a group) of each 3D point (e.g., P0-P9) is generated based on a distance of each 3D point, and then attribute values of 3D points in each LoD is encoded by applying prediction in an LoD-based order 110 instead of an original order 105 of the 3D points. For example, an attributes value of the 3D point P2 is predicted by calculating a distance-based weighted average value of the 3D points P0, P5 and P4 that were encoded or decoded prior to the 3D point P2.

A current anchor method in G-PCC proceeds as follows.

First, a variability of a neighborhood of a 3D point is computed to check how different neighbor values are, and if the variability is lower than a threshold, the calculation of the distance-based weighted average prediction is conducted by predicting attribute values $(a_i)_{i \in 0 \ldots k-1}$, using a linear interpolation process based on distances of nearest neighbors of a current point i. Let $\aleph_i$ be a set of k-nearest neighbors of the current point i, let $(\tilde{a}_j)_{j \in \aleph_i}$ be their decoded/reconstructed attribute values and let $(\delta_j)_{j \in \aleph_i}$ be their distances to the current point i. A predicted attribute value $\hat{a}_i$ is then given by:

$$\hat{a}_i = \text{Round}\left( \frac{1}{k} \sum_{j \in \aleph_i} \frac{\frac{1}{\delta_j^2}}{\sum_{j \in \aleph_i} \frac{1}{\delta_j^2}} \tilde{a}_j \right). \quad (1)$$

Note that geometric locations of all point clouds are already available when attributes are coded. In addition, the neighboring points together with their reconstructed attribute values are available both at an encoder and a decoder as a k-dimensional tree structure that is used to facilitate a nearest neighbor search for each point in an identical manner.

Second, if the variability is higher than the threshold, a rate-distortion optimized (RDO) predictor selection is performed. Multiple predictor candidates or candidate predicted values are created based on a result of a neighbor point search in generating LoD. For example, when the attributes value of the 3D point P2 is encoded by using prediction, a weighted average value of distances from the 3D point P2 to respectively the 3D points P0, P5 and P4 is set to a predictor index equal to 0. Then, a distance from the 3D point P2 to the nearest neighbor point P4 is set to a predictor index equal to 1. Moreover, distances from the 3D point P2 to respectively the next nearest neighbor points P5 and P0 are set to predictor indices equal to 2 and 3, as shown in Table 1 below.

TABLE 1

Sample of predictor candidate for attributes coding

| Predictor index | Predicted value |
|---|---|
| 0 | average |
| 1 | P4 ($1^{st}$ nearest point) |
| 2 | P5 ($2^{nd}$ nearest point) |
| 3 | P0 ($3^{rd}$ nearest point) |

After creating predictor candidates, a best predictor is selected by applying a rate-distortion optimization procedure, and then, a selected predictor index is mapped to a truncated unary (TU) code, bins of which will be arithmetically encoded. Note that a shorter TU code will be assigned to a smaller predictor index in Table 1.

A maximum number of predictor candidates MaxNumCand is defined and is encoded into an attributes header. In the current implementation, the maximum number of predictor candidates MaxNumCand is set to equal to numberOfNearestNeighborsInPrediction+1 and is used in encoding and decoding predictor indices with a truncated unary binarization.

A lifting transform for attribute coding in G-PCC builds on top of a predicting transform described above. A main difference between the prediction scheme and the lifting scheme is the introduction of an update operator.

FIG. 1B is a diagram of an architecture for P/U (Prediction/Update)-lifting in G-PCC. To facilitate prediction and update steps in lifting, one has to split a signal into two sets of high-correlation at each stage of decomposition. In the lifting scheme in G-PCC, the splitting is performed by leveraging an LoD structure in which such high-correlation is expected among levels and each level is constructed by a nearest neighbor search to organize non-uniform point clouds into a structured data. A P/U decomposition step at a level N results in a detail signal D(N−1) and an approximation signal A(N−1), which is further decomposed into D(N−2) and A(N−2). This step is repeatedly applied until a base layer approximation signal A(1) is obtained.

Consequently, instead of coding an input attribute signal itself that consists of LOD(N), . . . , LOD(1), one ends up coding D(N−1), D(N−2), . . . , D(1), A(1) in the lifting scheme. Note that application of efficient P/U steps often leads to sparse sub-bands "coefficients" in D(N−1), . . . , D(1), thereby providing a transform coding gain advantage.

Currently, a distance-based weighted average prediction described above for the predicting transform is used for a prediction step in the lifting as an anchor method in G-PCC.

For point cloud attributes such as color, there may be significant redundancy among channels. To improve coding efficiency, a color space conversion may be performed as a pre-/post-processing step. One problem of color space conversion as a pre-/post-processing step is that it may lack orthonormality, and optimizing the codec performance in the converted color space may not necessarily translate into a good quality in the original space. In addition, lossless color transforms may tend to have extended bit-depths especially when one tries to approximate the non-integer color transform with a good precision. This can be an issue depending on the implementation constraints in many practical systems.

SUMMARY

According to embodiments, a method of interframe point cloud attribute coding is performed by at least one processor and includes coding a first color attribute of a point of a point cloud to obtain a first reconstructed residual, coding a second color attribute of the point to obtain a second reconstructed residual, and determining a quantization index of the second reconstructed residual, based on the first reconstructed residual and the second reconstructed residual. The method further includes updating the second reconstructed residual, based on the quantization index and the first reconstructed residual.

According to embodiments, an apparatus for interframe point cloud attribute coding, includes at least one memory configured to store computer program code, and at least one processor configured to access the at least one memory and operate according to the computer program code. The computer program code includes coding code configured to cause the at least one processor to code a first color attribute of a point of a point cloud to obtain a first reconstructed residual, and code a second color attribute of the point to obtain a second reconstructed residual, and first determining code configured to cause the at least one processor to determine a quantization index of the second reconstructed residual, based on the first reconstructed residual and the second reconstructed residual. The computer program code further includes updating code configured to cause the at least one processor to update the second reconstructed residual, based on the quantization index and the first reconstructed residual.

A non-transitory computer-readable storage medium storing instructions that cause at least one processor to code a first color attribute of a point of a point cloud to obtain a first reconstructed residual, code a second color attribute of the point to obtain a second reconstructed residual, and determine a quantization index of the second reconstructed residual, based on the first reconstructed residual and the second reconstructed residual. The instructions further cause the at least one processor to update the second reconstructed residual, based on the quantization index and the first reconstructed residual.

BRIEF DESCRIPTION OF THE DRAWINGS

FIG. 8 is a diagram of a computer system suitable for implementing embodiments.

DETAILED DESCRIPTION

Embodiments described herein provide a method and an apparatus for inter-channel prediction and transform for point cloud attribute coding. The method and apparatus efficiently perform inter-channel decorrelation for compression efficiency. The method and apparatus pertain to a current G-PCC predictor design described with respect to FIG. 1A. The method and apparatus can be applied to similar codecs designed for point clouds.

Figure 2:
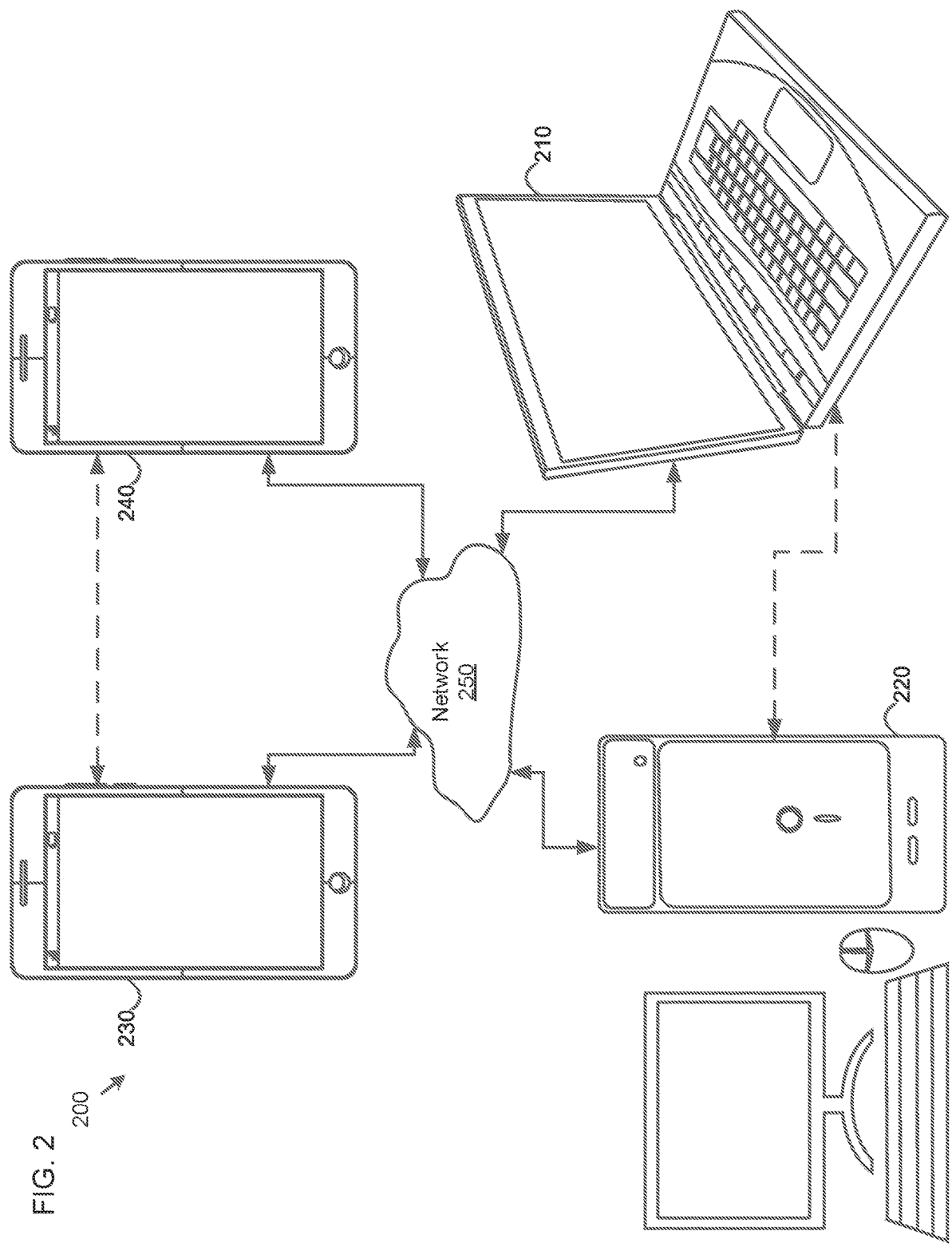
FIG. 2 is a block diagram of a communication system according to embodiments.

FIG. 2 is a block diagram of a communication system 200 according to embodiments. The communication system 200 may include at least two terminals 210 and 220 interconnected via a network 250. For unidirectional transmission of data, a first terminal 210 may code point cloud data at a local location for transmission to a second terminal 220 via the network 250. The second terminal 220 may receive the coded point cloud data of the first terminal 210 from the network 250, decode the coded point cloud data and display the decoded point cloud data. Unidirectional data transmission may be common in media serving applications and the like.

FIG. 2 further illustrates a second pair of terminals 230 and 240 provided to support bidirectional transmission of coded point cloud data that may occur, for example, during videoconferencing. For bidirectional transmission of data, each terminal 230 or 240 may code point cloud data captured at a local location for transmission to the other terminal via the network 250. Each terminal 230 or 240 also may receive the coded point cloud data transmitted by the other terminal, may decode the coded point cloud data and may display the decoded point cloud data at a local display device.

In FIG. 2, the terminals 210-240 may be illustrated as servers, personal computers and smartphones, but principles of the embodiments are not so limited. The embodiments find application with laptop computers, tablet computers, media players and/or dedicated video conferencing equipment. The network 250 represents any number of networks that convey coded point cloud data among the terminals 210-240, including for example wireline and/or wireless communication networks. The communication network 250 may exchange data in circuit-switched and/or packet-switched channels. Representative networks include telecommunications networks, local area networks, wide area networks and/or the Internet. For the purposes of the present discussion, an architecture and topology of the network 250 may be immaterial to an operation of the embodiments unless explained herein below.

Figure 3:
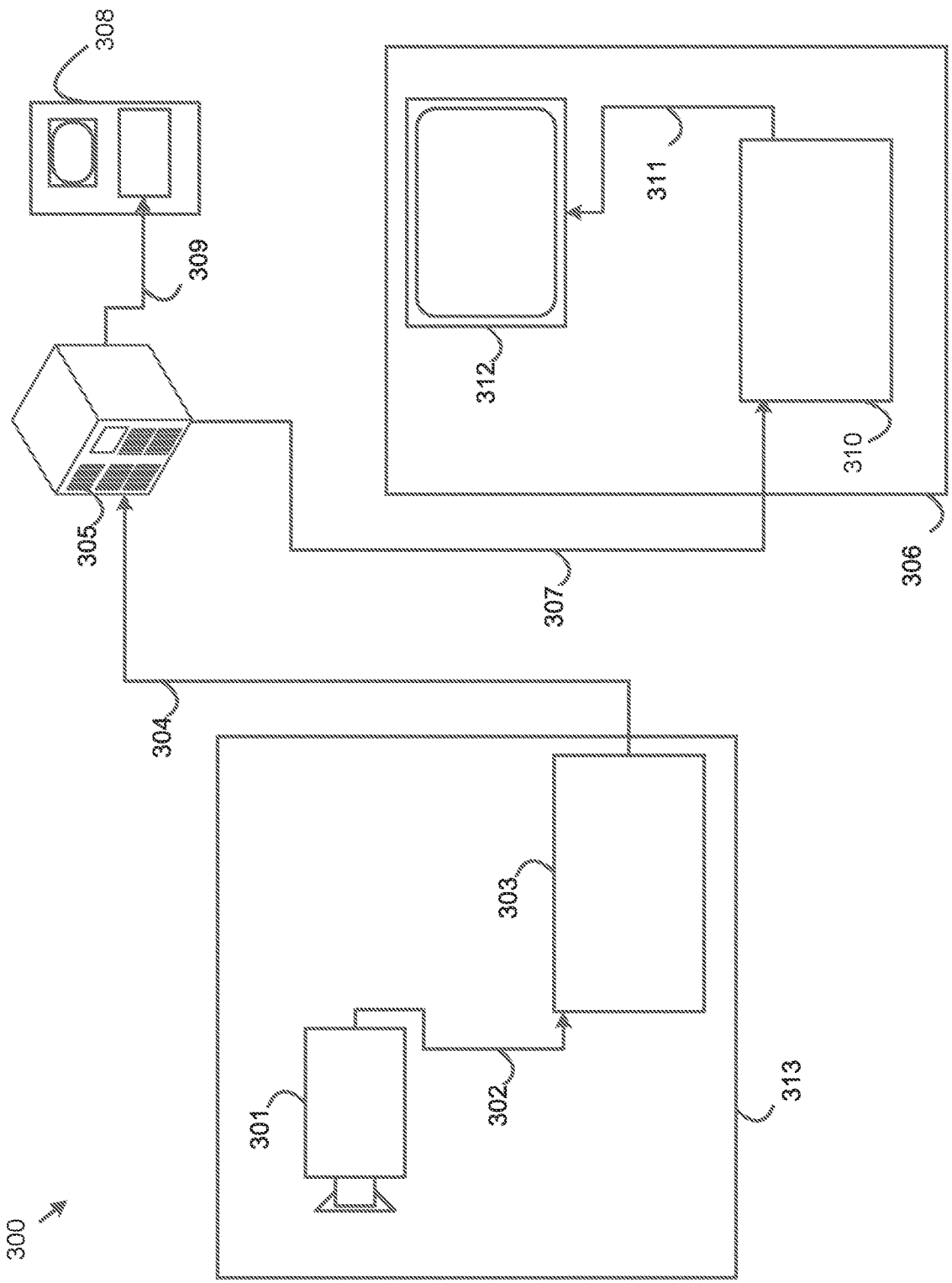
FIG. 3 is a diagram of a placement of a G-PCC compressor and a G-PCC decompressor in an environment, according to embodiments.

FIG. 3 is a diagram of a placement of a G-PCC compressor 303 and a G-PCC decompressor 310 in an environment, according to embodiments. The disclosed subject matter can be equally applicable to other point cloud enabled applications, including, for example, video conferencing, digital TV, storing of compressed point cloud data on digital media including CD, DVD, memory stick and the like, and so on.

A streaming system 300 may include a capture subsystem 313 that can include a point cloud source 301, for example a digital camera, creating, for example, uncompressed point cloud data 302. The point cloud data 302 having a higher data volume can be processed by the G-PCC compressor 303 coupled to the point cloud source 301. The G-PCC compressor 303 can include hardware, software, or a combination thereof to enable or implement aspects of the disclosed subject matter as described in more detail below. Encoded point cloud data 304 having a lower data volume can be stored on a streaming server 305 for future use. One or more streaming clients 306 and 308 can access the streaming server 305 to retrieve copies 307 and 309 of the encoded point cloud data 304. A client 306 can include the G-PCC decompressor 310, which decodes an incoming copy 307 of the encoded point cloud data and creates outgoing point cloud data 311 that can be rendered on a display 312 or other rendering devices (not depicted). In some streaming systems, the encoded point cloud data 304, 307 and 309 can be encoded according to video coding/compression standards. Examples of those standards include those being developed by MPEG for G-PCC.

Figure 4:
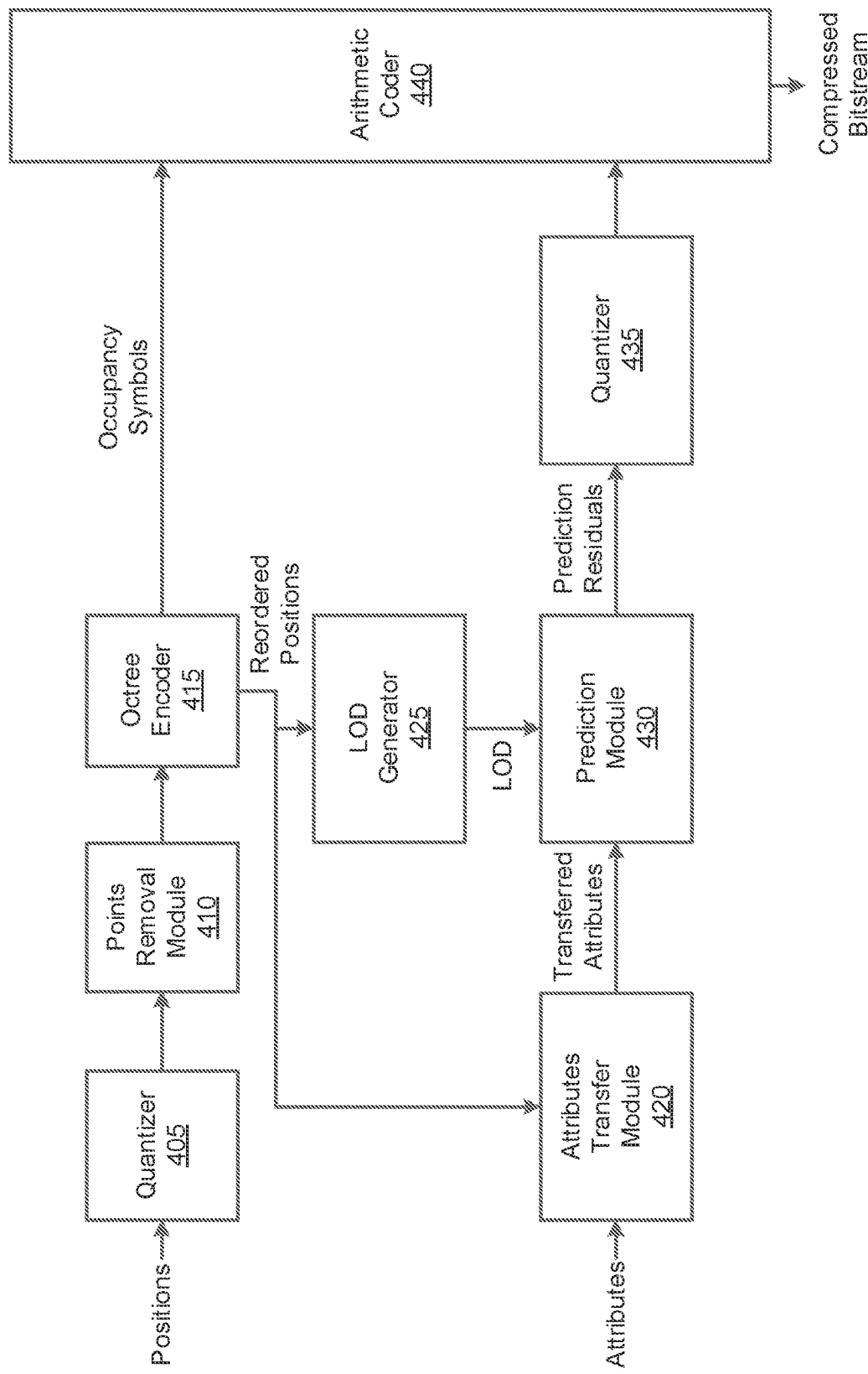
FIG. 4 is a functional block diagram of the G-PCC compressor according to embodiments.

FIG. 4 is a functional block diagram of a G-PCC compressor 303 according to embodiments.

As shown in FIG. 4, the G-PCC compressor 303 includes a quantizer 405, a points removal module 410, an octree encoder 415, an attributes transfer module 420, an LoD generator 425, a prediction module 430, a quantizer 435 and an arithmetic coder 440.

The quantizer 405 receives positions of points in an input point cloud. The positions may be (x,y,z)-coordinates. The quantizer 405 further quantizes the received positions, using, e.g., a scaling algorithm and/or a shifting algorithm.

The points removal module 410 receives the quantized positions from the quantizer 405, and removes or filters duplicate positions from the received quantized positions.

The octree encoder 415 receives the filtered positions from the points removal module 410, and encodes the received filtered positions into occupancy symbols of an octree representing the input point cloud, using an octree encoding algorithm. A bounding box of the input point cloud corresponding to the octree may be any 3D shape, e.g., a cube.

The octree encoder 415 further reorders the received filtered positions, based on the encoding of the filtered positions.

The attributes transfer module 420 receives attributes of points in the input point cloud. The attributes may include, e.g., a color or RGB value and/or a reflectance of each point. The attributes transfer module 420 further receives the reordered positions from the octree encoder 415.

The attributes transfer module 420 further updates the received attributes, based on the received reordered positions. For example, the attributes transfer module 420 may perform one or more among pre-processing algorithms on the received attributes, the pre-processing algorithms including, for example, weighting and averaging the received attributes and interpolation of additional attributes from the received attributes. The attributes transfer module 420 further transfers the updated attributes to the prediction module 430.

The LoD generator 425 receives the reordered positions from the octree encoder 415, and obtains an LoD of each of the points corresponding to the received reordered positions. Each LoD may be considered to be a group of the points, and may be obtained based on a distance of each of the points. For example, as shown in FIG. 1A, points P0, P5, P4 and P2 may be in an LoD LOD0, points P0, P5, P4, P2, P1, P6 and P3 may be in an LoD LOD1, and points P0, P5, P4, P2, P1, P6, P3, P9, P8 and P7 may be in an LoD LOD2.

The prediction module 430 receives the transferred attributes from the attributes transfer module 420, and receives the obtained LoD of each of the points from the LoD generator 425. The prediction module 430 obtains prediction residuals (values) respectively of the received attributes by applying a prediction algorithm to the received attributes in an order based on the received LoD of each of the points. The prediction algorithm may include any among various prediction algorithms such as, e.g., interpolation, weighted average calculation, a nearest neighbor algorithm and RDO.

Figure 1A:
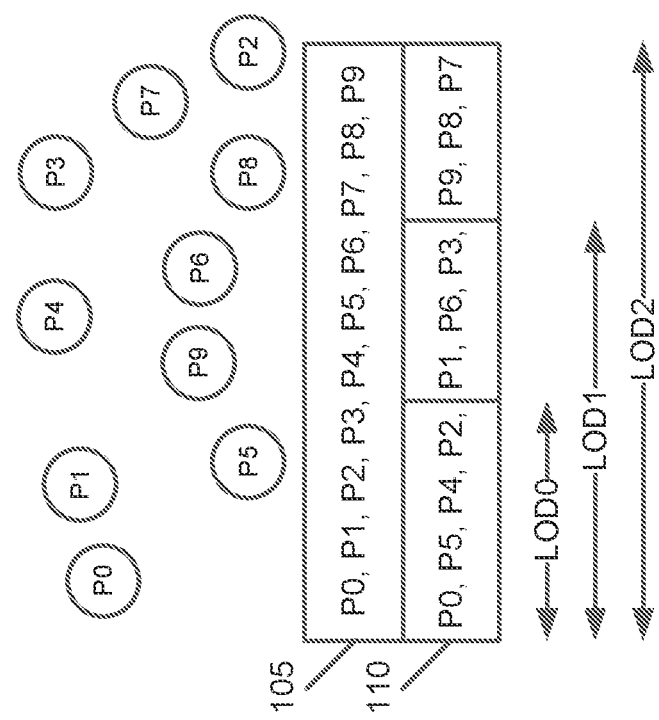
FIG. 1A is a diagram illustrating a method of generating LoD in G-PCC.
Figure 1B:
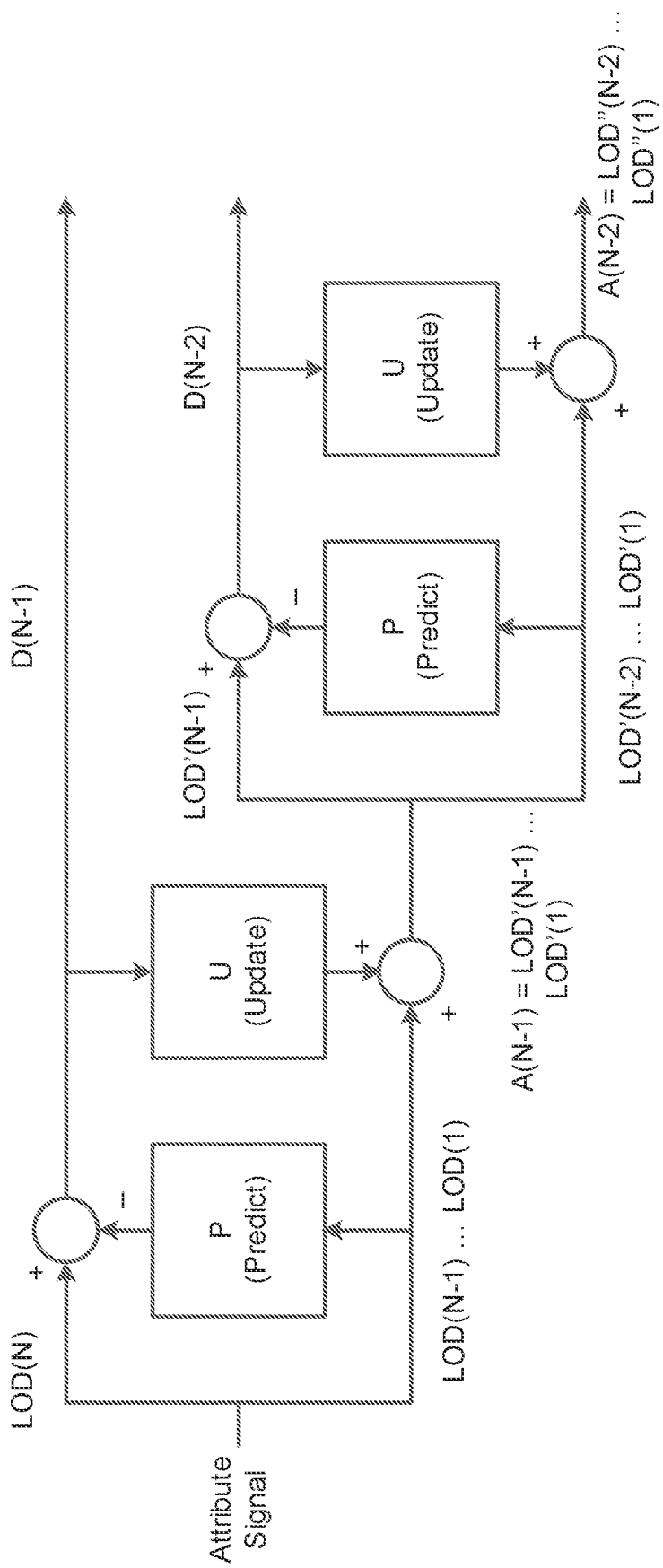
FIG. 1B is a diagram of an architecture for P/U-lifting in G-PCC.

For example, as shown in FIG. 1A, the prediction residuals respectively of the received attributes of the points P0, P5, P4 and P2 included in the LoD LOD0 may be obtained first prior to those of the received attributes of the points P1, P6, P3, P9, P8 and P7 included respectively in the LoDs LOD1 and LOD2. The prediction residuals of the received attributes of the point P2 may be obtained by calculating a distance based on a weighted average of the points P0, P5 and P4.

The quantizer 435 receives the obtained prediction residuals from the prediction module 430, and quantizes the received predicted residuals, using, e.g., a scaling algorithm and/or a shifting algorithm.

The arithmetic coder 440 receives the occupancy symbols from the octree encoder 415, and receives the quantized prediction residuals from the quantizer 435. The arithmetic coder 440 performs arithmetic coding on the received occupancy symbols and quantized predictions residuals to obtain a compressed bitstream. The arithmetic coding may include any among various entropy encoding algorithms such as, e.g., context-adaptive binary arithmetic coding.

Figure 5:
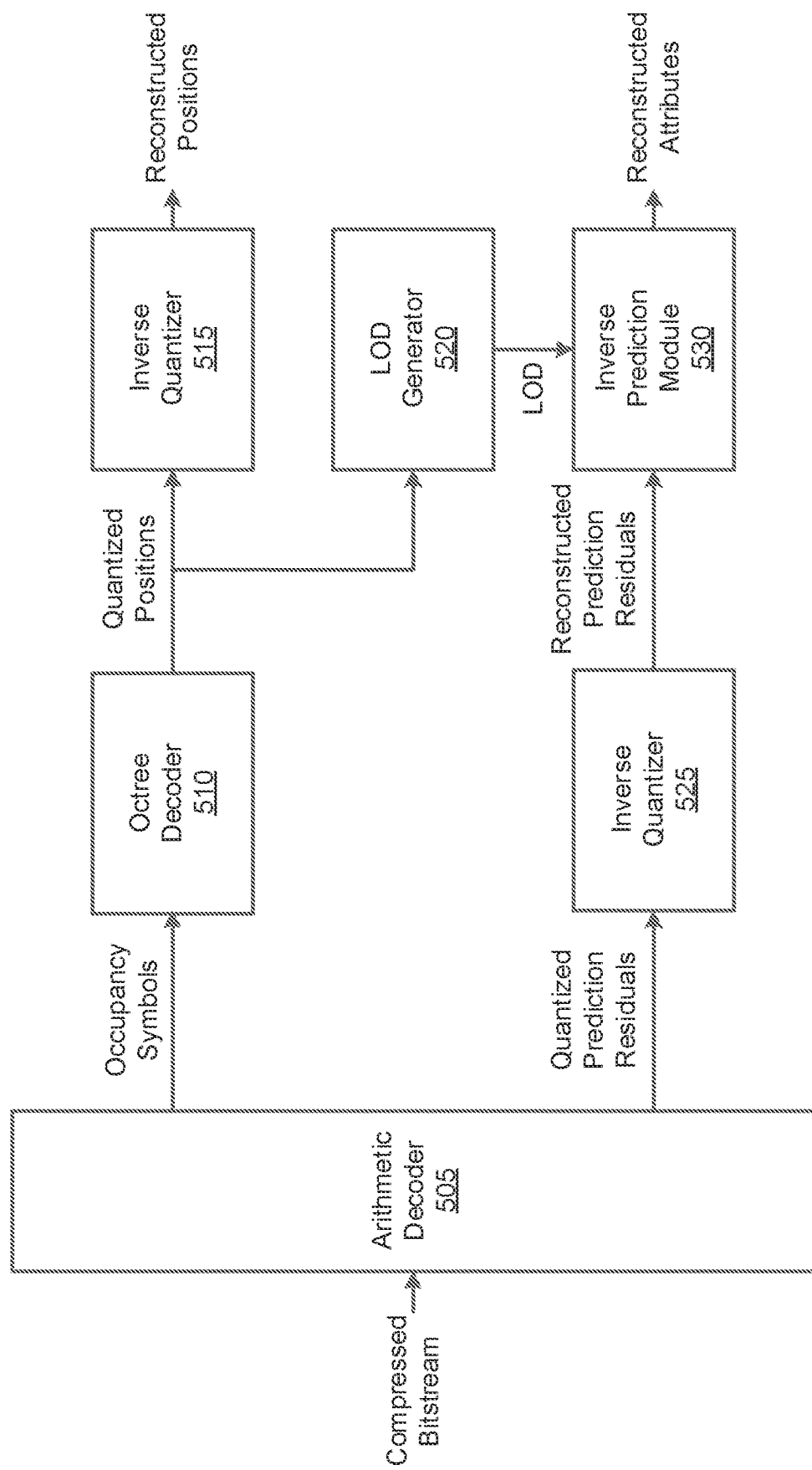
FIG. 5 is a functional block diagram of the G-PCC decompressor according to embodiments.

FIG. 5 is a functional block diagram of a G-PCC decompressor 310 according to embodiments.

As shown in FIG. 5, the G-PCC decompressor 310 includes an arithmetic decoder 505, an octree decoder 510, an inverse quantizer 515, an LoD generator 520, an inverse quantizer 525 and an inverse prediction module 530.

The arithmetic decoder 505 receives the compressed bitstream from the G-PCC compressor 303, and performs arithmetic decoding on the received compressed bitstream to obtain the occupancy symbols and the quantized prediction residuals. The arithmetic decoding may include any among various entropy decoding algorithms such as, e.g., context-adaptive binary arithmetic decoding.

The octree decoder 510 receives the obtained occupancy symbols from the arithmetic decoder 505, and decodes the received occupancy symbols into the quantized positions, using an octree decoding algorithm.

The inverse quantizer 515 receives the quantized positions from the octree decoder 510, and inverse quantizes the received quantized positions, using, e.g., a scaling algorithm and/or a shifting algorithm, to obtain reconstructed positions of the points in the input point cloud.

The LoD generator 520 receives the quantized positions from the octree decoder 510, and obtains the LoD of each of the points corresponding to the received quantized positions.

The inverse quantizer 525 receives the obtained quantized prediction residuals, and inverse quantizes the received quantized prediction residuals, using, e.g., a scaling algorithm and/or a shifting algorithm, to obtain reconstructed prediction residuals.

The inverse prediction module 530 receives the obtained reconstructed prediction residuals from the inverse quantizer 525, and receives the obtained LoD of each of the points from the LoD generator 520. The inverse prediction module 530 obtains reconstructed attributes respectively of the received reconstructed prediction residuals by applying a prediction algorithm to the received reconstructed prediction residuals in an order based on the received LoD of each of the points. The prediction algorithm may include any among various prediction algorithms such as, e.g., interpolation, weighted average calculation, a nearest neighbor algorithm and RDO. The reconstructed attributes are of the points in the input point cloud.

The method and the apparatus for inter-channel prediction and transform for point cloud attribute coding will now be described in detail. Such a method and an apparatus may be implemented in the G-PCC compressor 303 described above, namely, the prediction module 430. The method and the apparatus may also be implemented in the G-PCC decompressor 310, namely, the inverse prediction module 530.

A. Inloop Color Residual Transform and Prediction

In embodiments, two methods can avoid the aforementioned problems of using a color space transform as a conversion tool for coding efficiency.

One method is to use a YCoCg-R transform as a lossless inloop transform of prediction residuals in Differential Pulse Code Modulation (DPCM) (aka a predicting transform) for G-PCC to decorrelate inter-channel dependency while maintaining near-lossless and lossless reconstruction. Y is a luma value, Co is a chrominance orange value, and Cg is a chrominance green value.

Another method is to introduce additional steps of prediction to predict residual values of other channels in DPCM for G-PCC.

Both of the above-described methods will be detailed as follows.

1. Inloop Color Residual Transform

A YCoCg transform is given as follows:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix} \begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix} \quad (2)$$

R is a red value, G is a green value, and B is a blue value.

As a lossless transform that is derived from the YCoCg transform, a forward YCoCg-R transform is given as follows:

$$Co = R - B \quad (3)$$

$$t = B + (Co >> 1) \quad (4)$$

$$Cg = G - t \quad (5)$$

$$Y = t + (Cg >> 1) \quad (6)$$

t represents an intermediary value used to derive the lossless transform.

A backward YCoCg-R transform reverses the above process as follows:

$$t = Y - (Cg >> 1) \quad (7)$$

$$G = Cg + t \quad (8)$$

$$B = t - (Co >> 1) \quad (9)$$

$$R = B + Co \quad (10)$$

When applying the YCoCg-R transform as a residual transform, a signal R, G, and B will be prediction residuals of each channel resulting from per channel prediction in G-PCC. For example, referring to FIG. 4, the prediction module 430 may obtain the signal R, G, and B as original prediction residuals of color attributes of points of a point cloud, may apply the YCoCg-R transform to the obtained original prediction residuals to obtain a Y, Co, and Cg signal as new prediction residuals of the color attributes, and may output the obtained new prediction residuals to the quantizer 435.

2. Inter-Channel Color Residual Predictor

Another way of decorrelating a multi-channel signal is to use a predictor. In embodiments, a predictor is used to predict residual signals of channels so that second order residuals will be quantized and entropy-coded instead of original residuals.

For G-PCC prediction design, a version can be described as follows, where underlined parts are changes to a current G-PCC specification. Any form of a linear or nonlinear predictor function can be introduced for possible improvement of this prediction.

Definitions of notations are provided as follows:

---

X: channel X signal
X_pred: predicted channel X signal (obtained from reconstructed neighbor samples in G-PCC)
X_delta_index: quantization index of prediction residual of channel X
X_delta_recon: reconstructed residual for channel X
X_recon: reconstructed channel X signal
X_delta_residual_index: quantization index of residual from residual-prediction
a. Encoding
// G-Channel
G_delta_index <- Quantize(G-G_pred)
G_delta_recon <- InverseQuantize(G_delta_index)
G_recon <- G_pred + G_delta_index
EntropyEncode(G_delta_index)
// C-Channels ('C'can be either R or B)

```
C_delta_index <- Quantize(C-C_pred)
C_delta_recon <- InverseQuantize(C_delta_index)
C_delta_residual index <- Quantize(C_delta_recon − G_delta_recon)
C_delta_recon <- InverseQuantize(C_delta_residual_index) +
    G_delta_recon
C_recon <- C_pred + C_delta_recon
EntopyEncode(C_delta_residual_index)
b. Decoding
// G-Channel
G_delta_index <- EntropyDecode( )
G_delta_recon <- InverseQuantize(G_delta_index)
G_recon <- G_pred + G_delta_recon
// C-Channels ('C' can be either R or B)
C_delta_residual_index <- EntropyDecode( )
C_delta_recon <- InverseQuantize(C_delta_residual_index) +
    G_delta_recon
C_recon <- C_pred + C_delta_recon
```

For example, referring to FIG. 4, the prediction module 430 obtains a first reconstructed residual for a green color channel (G_delta_recon) and a second reconstructed residual for a red or blue color channel (C_delta_recon). The prediction module 430 then subtracts the obtained first reconstructed residual from the obtained second reconstructed residual, and quantizes a result of this subtraction, to obtain a quantization index of the second reconstructed residual for the red or blue color channel (C_delta_residual_index). Next, the prediction module 430 inverse quantizes the obtained quantization index, and adds a result of this inverse quantization to the first reconstructed residual, to re-obtain the second reconstructed residual. The prediction module 430 may output the re-obtained second reconstructed residual to the quantizer 435.

Advantages of the inter-channel residual predictor for G-PCC and similar point cloud codecs may include a change in a decoding process being minor. Further, the inter-channel residual predictor does not require any elaborate multi-channel signal model. Unlike other lossless color transform-based approaches for inter-channel decorrelation, including a inloop residual transform discussed above, the inter-channel residual predictor can control a fidelity of a signal in an original domain in terms of a Hausdorff metric. This is because quantization is performed in an original (RGB color) space.

B. Improving Inloop Color Residual Transform and Prediction for G-PCC

The following embodiments will apply equally to both an inloop color residual transform and an inter-channel color residual predictor under a context of DPCM prediction (aka a predicting transform) in G-PCC. The inloop color residual transform and the inter-channel color residual predictor will be called an inter-channel tool.

In embodiments, several methods of a conditional check for deciding whether to apply an inter-channel tool to a current point of a point cloud, are described as follows.

In examples, a maximum difference of reconstructed residual values of three channels are computed for each of nearest neighbors. More specifically, a decoder can track how many neighbors experienced a reduced residual magnitude/variance by a set threshold after applying an inter-channel tool. When the three reconstructed residual values are relatively even (i.e., not reduced in value), chances are decorrelation is not successful and does not need to be performed. This needs a bookkeeping of one-flag to indicate a result of such testing per each point, when decoded. Also, a majority-voting may be performed when making a decision.

In other examples, maximum absolute difference values of three channels from neighbor points are compared. When there is a significant difference in variability of the values among the color channels, chances are that predicting one from another can be difficult, and an inter-channel tool does not need to be used.

In other examples, any measure that can identify inter-channel correlation from neighbor samples can be incorporated to determine use of an inter-channel tool.

In other examples, a tile/slice-level (e.g., in tile/slice header) flag or a video/picture-level (e.g., in a Sequence Parameter Set (SPS)/Picture Parameter Set (PPS)) flag can be signaled to enable/disable a color residual transform or a color residual predictor. The signaling can be applied to any grouping of point cloud pixels that constitutes a coding-unit.

Referring to FIG. 4, based on any of the above-described flags, the prediction module 430 may determine whether to apply an interloop color residual transform to prediction residuals, and/or use an inter-channel color residual predictor to obtain new prediction residuals from original prediction residuals.

Figure 6:
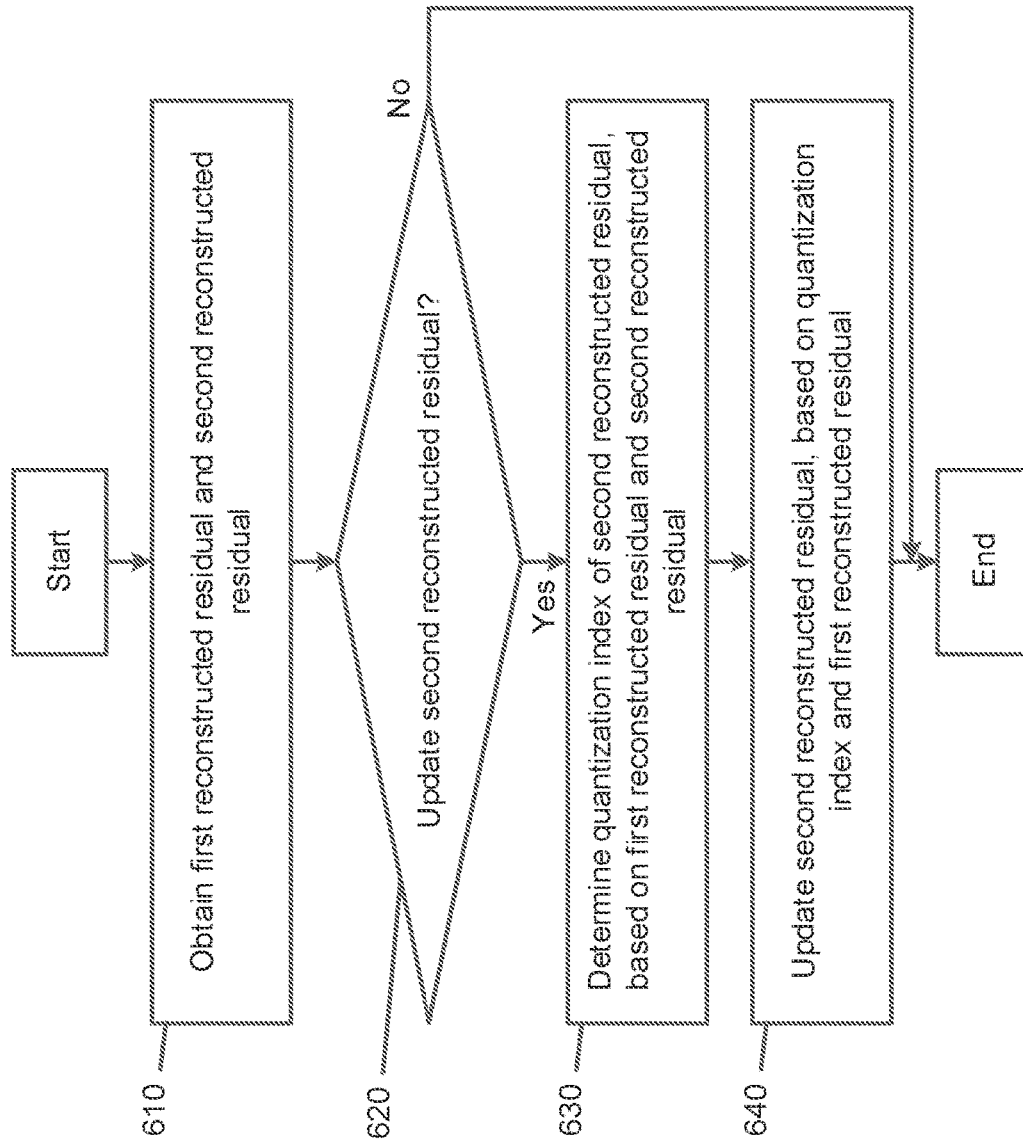
FIG. 6 is a flowchart illustrating a method of inter-channel prediction and transform for point cloud attribute coding, according to embodiments.

FIG. 6 is a flowchart illustrating a method 600 of inter-channel prediction and transform for point cloud attribute coding, according to embodiments. In some implementations, one or more process blocks of FIG. 6 may be performed by the G-PCC decompressor 310. In some implementations, one or more process blocks of FIG. 6 may be performed by another device or a group of devices separate from or including the G-PCC decompressor 310, such as the G-PCC compressor 303.

Referring to FIG. 6, in a first block 610, the method 600 includes coding a first color attribute of a point of a point cloud to obtain a first reconstructed residual, and coding a second color attribute of the point to obtain a second reconstructed residual.

In a second block 620, the method 600 includes determining whether to update the second reconstructed residual, based on a flag corresponding to the point. Based on the second reconstructed residual being determined to be updated, the method 600 continues in a third block 630. Otherwise, the method 600 ends.

In the third block 630, the method 600 includes determining a quantization index of the second reconstructed residual, based on the first reconstructed residual and the second reconstructed residual.

In a fourth block 640, the method 600 includes updating the second reconstructed residual, based on the quantization index and the first reconstructed residual.

The determining the quantization index may include subtracting the first reconstructed residual from the second reconstructed residual, and quantizing a result of the first reconstructed residual being subtracted from the second reconstructed residual, to determine the quantization index.

The updating the second reconstructed residual may include inverse quantizing the quantization index, and adding the inverse quantized quantization index to the first reconstructed residual, to update the second reconstructed residual.

The method may further include applying a YCoCg-R transform to the first reconstructed residual and the second reconstructed residual, to update the first reconstructed residual and the second reconstructed residual, wherein the YCoCg-R transform is expressed by Equation (2).

The method may further include determining whether to apply the YcoCg-R transform, based on the flag. The applying the YcoCg-R transform may include, based on the YcoCg-R transform being determined to be applied, applying the YcoCg-R transform to the first reconstructed residual and the second reconstructed residual.

The flag may be indicated in a tile or slice level of the point cloud.

Although FIG. 6 shows example blocks of the method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 7:
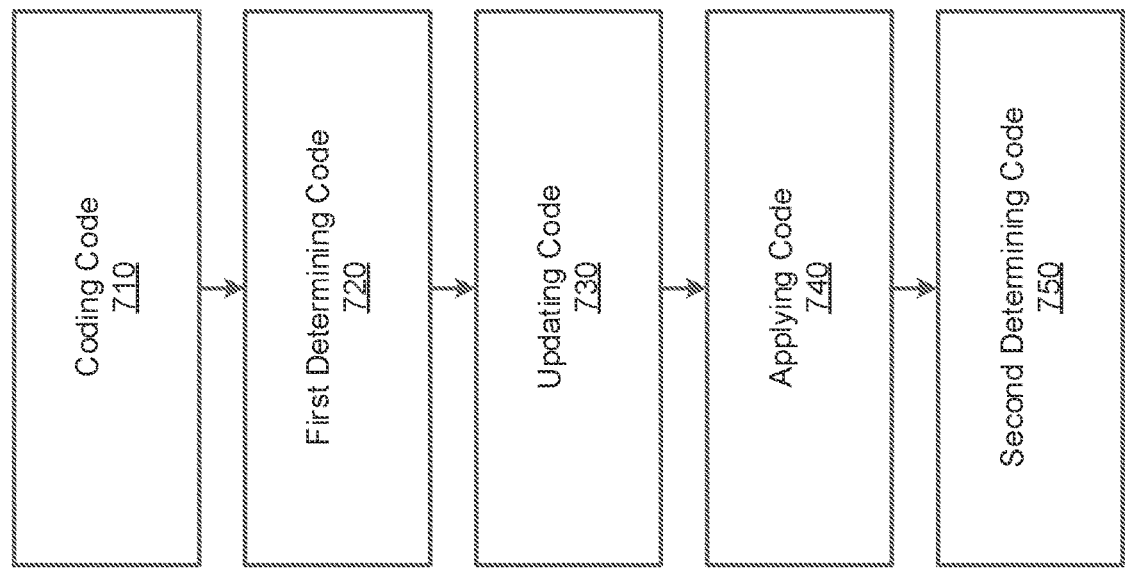
FIG. 7 is a block diagram of an apparatus for inter-channel prediction and transform for point cloud attribute coding, according to embodiments.

FIG. 7 is a block diagram of an apparatus 700 for inter-channel prediction and transform for point cloud attribute coding, according to embodiments.

Referring to FIG. 7, the apparatus 700 includes coding code 710, first determining code 720, and updating code 730.

The coding code 710 is configured to cause at least one processor to code a first color attribute of a point of a point cloud to obtain a first reconstructed residual, and code a second color attribute of the point to obtain a second reconstructed residual.

The first determining code 720 is configured to cause the at least one processor to determine a quantization index of the second reconstructed residual, based on the first reconstructed residual and the second reconstructed residual.

The updating code 730 is configured to cause the at least one processor to update the second reconstructed residual, based on the quantization index and the first reconstructed residual.

The first determining code 720 may be further configured to cause the at least one processor to subtract the first reconstructed residual from the second reconstructed residual, and quantize a result of the first reconstructed residual being subtracted from the second reconstructed residual, to determine the quantization index.

The updating code 730 may be further configured to cause the at least one processor to inverse quantize the quantization index, and add the inverse quantized quantization index to the first reconstructed residual, to update the second reconstructed residual.

The apparatus 700 may further include applying code 740 configured to cause the at least one processor to apply a YcoCg-R transform to the first reconstructed residual and the second reconstructed residual, to update the first reconstructed residual and the second reconstructed residual, wherein the YcoCg-R transform is expressed by Equation (2).

The apparatus 700 may further include second determining code 750 configured to cause the at least one processor to determine whether to apply the YcoCg-R transform, based on a flag corresponding to the point. The applying code 740 may be further configured to cause the at least one processor to, based on the YcoCg-R transform being determined to be applied, apply the YcoCg-R transform to the first reconstructed residual and the second reconstructed residual.

The second determining code 750 may be further configured to cause the at least one processor to determine whether to update the second reconstructed residual, based on a flag corresponding to the point. The first determining code 720 may be further configured to, based on the second reconstructed residual being determined to be updated, determine the quantization index of the second reconstructed residual, based on the first reconstructed residual and the second reconstructed residual.

The flag may be indicated in a tile or slice level of the point cloud.

FIG. 8 is a diagram of a computer system 800 suitable for implementing embodiments.

Computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for the computer system 800 are examples in nature and are not intended to suggest any limitation as to the scope of use or functionality of the computer software implementing the embodiments. Neither should the configuration of the components be interpreted as having any dependency or requirement relating to any one or combination of the components illustrated in the embodiments of the computer system 800.

The computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): a keyboard 801, a mouse 802, a trackpad 803, a touchscreen 810, a joystick 805, a microphone 806, a scanner 807, and a camera 808.

The computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touchscreen 810 or the joystick 805, but there can also be tactile feedback devices that do not serve as input devices), audio output devices (such as: speakers 809, headphones (not depicted)), visual output devices (such as screens 810 to include cathode ray tube (CRT) screens, liquid-crystal display (LCD) screens, plasma screens, organic light-emitting diode (OLED) screens, each with or without touchscreen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter 850 generates and outputs images to the touchscreen 810.

The computer system 800 can also include human accessible storage devices and their associated media such as optical media including a CD/DVD ROM/RW drive 820 with CD/DVD or the like media 821, a thumb drive 822, a removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system 800 can also include interface(s) to one or more communication networks 855. The communication networks 855 can for example be wireless, wireline, optical. The networks 855 can further be local, wide-area, metropolitan, vehicular and industrial, real-time, delay-tolerant, and so on. Examples of the networks 855 include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANbus, and so forth. The networks 855 commonly require external network interface adapters that attached to certain general purpose data ports or peripheral buses 849 (such as, for example universal serial bus (USB) ports of the computer system 800; others are commonly integrated into the core of the computer system 800 by attachment to a system bus as described below, for example, a network interface 854 including an Ethernet interface into a PC computer system and/or a cellular network interface into a smartphone computer system. Using any of these networks 855, the computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks 855 and network interfaces 854 as described above.

Aforementioned human interface devices, human-accessible storage devices, and network interfaces 854 can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators 844 for certain tasks, and so forth. These devices, along with read-only memory (ROM) 845, random-access memory (RAM) 846, internal mass storage 847 such as internal non-user accessible hard drives, solid-state drives (SSDs), and the like, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through the peripheral buses 849. Architectures for a peripheral bus include peripheral component interconnect (PCI), USB, and the like.

The CPUs 841, GPUs 842, FPGAs 843, and hardware accelerators 844 can execute certain instructions that, in combination, can make up the aforementioned computer code. That computer code can be stored in the ROM 845 or RAM 846. Transitional data can also be stored in the RAM 846, whereas permanent data can be stored for example, in the internal mass storage 847. Fast storage and retrieve to any of the memory devices can be enabled through the use of cache memory, that can be closely associated with the CPU 841, GPU 842, internal mass storage 847, ROM 845, RAM 846, and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system 800 having architecture, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as the core-internal mass storage 847 or ROM 845. The software implementing various embodiments can be stored in such devices and executed by the core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in the RAM 846 and modifying such data structures according to the processes defined by the software. In addition or as an alternative, the computer system can provide functionality as a result of logic hardwired or otherwise embodied in a circuit (for example: the hardware accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of interframe point cloud attribute coding, the method being performed by at least one processor, and the method comprising:
   coding a first color attribute of a point of a point cloud to obtain a first reconstructed residual;
   coding a second color attribute of the point to obtain a second reconstructed residual; and
   determining whether to update the second reconstructed residual, based on a flag corresponding to the point.

2. The method of claim 1, further comprising:
   based on the second reconstructed residual being determined to be updated, determining a quantization index of the second reconstructed residual, based on the first reconstructed residual and the second reconstructed residual; and updating the second reconstructed residual, based on the quantization index and the first reconstructed residual.

3. The method of claim 2, wherein the determining the quantization index comprises:
subtracting the first reconstructed residual from the second reconstructed residual; and
quantizing a result of the first reconstructed residual being subtracted from the second reconstructed residual, to determine the quantization index.

4. The method of claim 2, wherein the updating the second reconstructed residual comprises:
inverse quantizing the quantization index; and
adding the inverse quantized quantization index to the first reconstructed residual, to update the second reconstructed residual.

5. The method of claim 1, further comprising applying a YCoCg-R transform to the first reconstructed residual and the second reconstructed residual, to update the first reconstructed residual and the second reconstructed residual,
wherein the YCoCg-R transform is expressed by:

$Co = R - B$ $t = B + (Co >> 1)$ $Cg = G - t$ $Y = t + (Cg >> 1)$, where Y is a luma value, Co is a chrominance orange value, Cg is a chrominance green value, R is a red value, G is a green value, and B is a blue value of the point.

6. The method of claim 5, further comprising determining whether to apply the YCoCg-R transform, based on the flag corresponding to the point,
wherein the applying the YCoCg-R transform comprises, based on the YCoCg-R transform being determined to be applied, applying the YCoCg-R transform to the first reconstructed residual and the second reconstructed residual.

7. The method of claim 1, wherein the flag is indicated in a tile or slice level of the point cloud.

8. An apparatus for interframe point cloud attribute coding, the apparatus comprising:
at least one memory configured to store computer program code; and
at least one processor configured to access the at least one memory and operate according to the computer program code, the computer program code comprising:
coding code configured to cause the at least one processor to code a first color attribute of a point of a point cloud to obtain a first reconstructed residual, and code a second color attribute of the point to obtain a second reconstructed residual; and
first determining code configured to cause the at least one processor to determine whether to update the second reconstructed residual, based on a flag corresponding to the point.

9. The apparatus of claim 8, wherein the computer program code further comprises:
second determining code configured to cause the at least one processor to, based on the second reconstructed residual being determined to be updated, determine a quantization index of the second reconstructed residual, based on the first reconstructed residual and the second reconstructed residual; and updating code configured to cause the at least one processor to update the second reconstructed residual, based on the quantization index and the first reconstructed residual.

10. The apparatus of claim 9, wherein the second determining code is further configured to cause the at least one processor to:
subtract the first reconstructed residual from the second reconstructed residual; and
quantize a result of the first reconstructed residual being subtracted from the second reconstructed residual, to determine the quantization index.

11. The apparatus of claim 9, wherein the updating code is further configured to cause the at least one processor to:
inverse quantize the quantization index; and
add the inverse quantized quantization index to the first reconstructed residual, to update the second reconstructed residual.

12. The apparatus of claim 8, wherein the computer program code further comprises applying code configured to cause the at least one processor to apply a YCoCg-R transform to the first reconstructed residual and the second reconstructed residual, to update the first reconstructed residual and the second reconstructed residual,
wherein the YCoCg-R transform is expressed by:

$Co = R - B$ $t = B + (Co >> 1)$ $Cg = G - t$ $Y = t + (Cg >> 1)$, where Y is a luma value, Co is a chrominance orange value, Cg is a chrominance green value, R is a red value, G is a green value, and B is a blue value of the point.

13. The apparatus of claim 12, wherein the computer program code further comprises third determining code configured to cause the at least one processor to determine whether to apply the YCoCg-R transform, based on the flag corresponding to the point,
wherein the applying code is further configured to cause the at least one processor to, based on the YCoCg-R transform being determined to be applied, apply the YCoCg-R transform to the first reconstructed residual and the second reconstructed residual.

14. The apparatus of claim 8, wherein the flag is indicated in a tile or slice level of the point cloud.

15. A non-transitory computer-readable storage medium storing instructions that cause at least one processor to:
code a first color attribute of a point of a point cloud to obtain a first reconstructed residual;
code a second color attribute of the point to obtain a second reconstructed residual; and
determine whether to update the second reconstructed residual, based on a flag corresponding to the point.

16. The non-transitory computer-readable storage medium of claim 15, wherein the instructions further cause the at least one processor to:
determine a quantization index of the second reconstructed residual, based on the first reconstructed residual and the second reconstructed residual; and
update the second reconstructed residual, based on the quantization index and the first reconstructed residual.

17. The non-transitory computer-readable storage medium of claim 16, wherein the instructions further cause the at least one processor to:

subtract the first reconstructed residual from the second reconstructed residual; and
quantize a result of the first reconstructed residual being subtracted from the second reconstructed residual, to determine the quantization index.

18. The non-transitory computer-readable storage medium of claim 16, wherein the instructions further cause the at least one processor to:
inverse quantize the quantization index; and
add the inverse quantized quantization index to the first reconstructed residual, to update the second reconstructed residual.

19. The non-transitory computer-readable storage medium of claim 15, wherein the instructions further cause the at least one processor to apply a YCoCg-R transform to the first reconstructed residual and the second reconstructed residual, to update the first reconstructed residual and the second reconstructed residual,
wherein the YCoCg-R transform is expressed by:

$$Co=R-B$$

$$t=B+(Co>>1)$$

$$Cg=G-t$$

$$Y=t+(Cg>>1),$$

where Y is a luma value, Co is a chrominance orange value, Cg is a chrominance green value, R is a red value, G is a green value, and B is a blue value of the point.

20. The non-transitory computer-readable storage medium of claim 19, wherein the instructions further cause the at least one processor to:
determine whether to apply the YCoCg-R transform, based on the flag corresponding to the point; and
based on the YCoCg-R transform being determined to be applied, apply the YCoCg-R transform to the first reconstructed residual and the second reconstructed residual.

* * * * *